US005540414A

United States Patent [19]

Giordani et al.

[11] Patent Number: 5,540,414
[45] Date of Patent: Jul. 30, 1996

[54] ACTUATOR AND ZONE VALVE

[75] Inventors: Attilio Giordani, New Port Richey, Fla.; Richard Genga, East Greenwich, R.I.

[73] Assignee: Taco, Inc., Cranston, R.I.

[21] Appl. No.: 237,070

[22] Filed: May 3, 1994

[51] Int. Cl.[6] ................................................. F16K 5/06
[52] U.S. Cl. ............................................. 251/174; 251/171
[58] Field of Search ........................... 251/129.03, 129.11, 251/129.12, 170, 171, 284, 286, 287, 288, 174

[56] References Cited

U.S. PATENT DOCUMENTS

| 3,248,080 | 4/1966 | Plasko . | |
|---|---|---|---|
| 3,561,730 | 2/1971 | Hurst | 251/174 X |
| 3,974,427 | 8/1976 | Carson . | |
| 4,020,864 | 5/1977 | Church, Jr. | 251/174 X |
| 4,203,573 | 5/1980 | Boss . | |
| 4,269,229 | 5/1981 | Saarem et al. | 251/129.12 X |
| 4,667,926 | 5/1987 | Takeda et al. | 251/170 |
| 4,762,301 | 8/1988 | Wozniak et al. | 251/171 |
| 4,800,308 | 1/1989 | Tice . | |
| 4,850,319 | 7/1989 | Imoehl . | |
| 4,957,072 | 9/1990 | Goldowsky | 123/437 X |
| 5,096,156 | 3/1992 | Wylie et al. . | |
| 5,131,623 | 7/1992 | Giordani . | |

*Primary Examiner*—Kevin Lee
*Attorney, Agent, or Firm*—Fish & Richardson P.C.

[57] ABSTRACT

A valve body including a first body member and a second body member adjacent the first body member, with the first and second body members defining a through-passage. A ball valve element having a bore therethrough is disposed within the valve body. A ball seat is interposed between the first and second body members. The ball seat is positioned to sealingly engage the ball valve element when the ball valve element is in the closed position to prevent fluid from passing by the ball valve element. The ball seat is resiliently biased against the first body member and against the ball valve element by a single biasing member positioned to provide both a fluid seal and a resilient bias between the ball seat and the first body member.

2 Claims, 7 Drawing Sheets

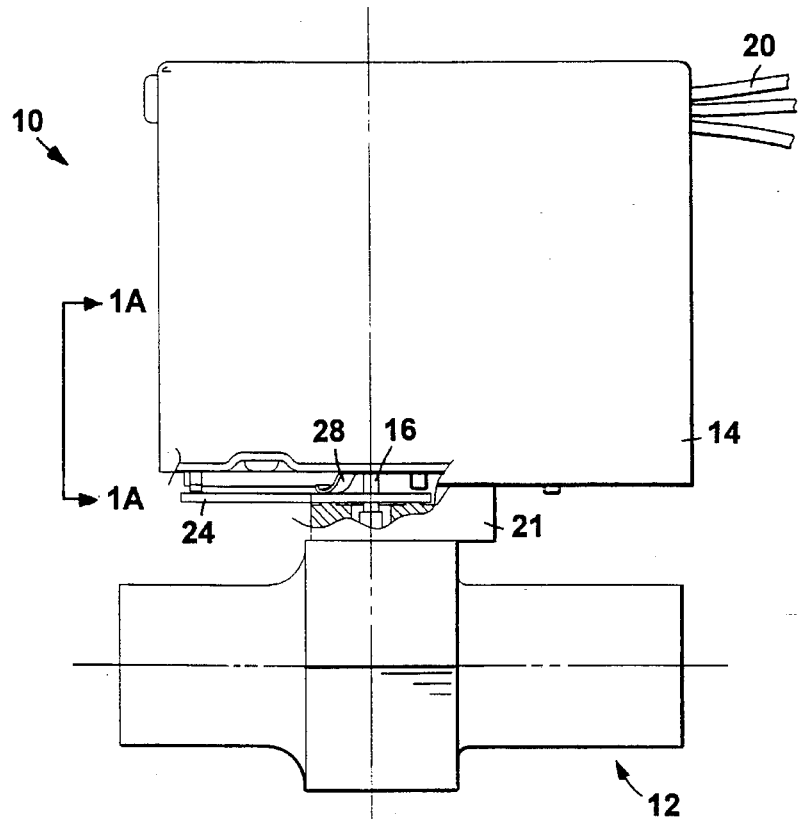
FIG. 1
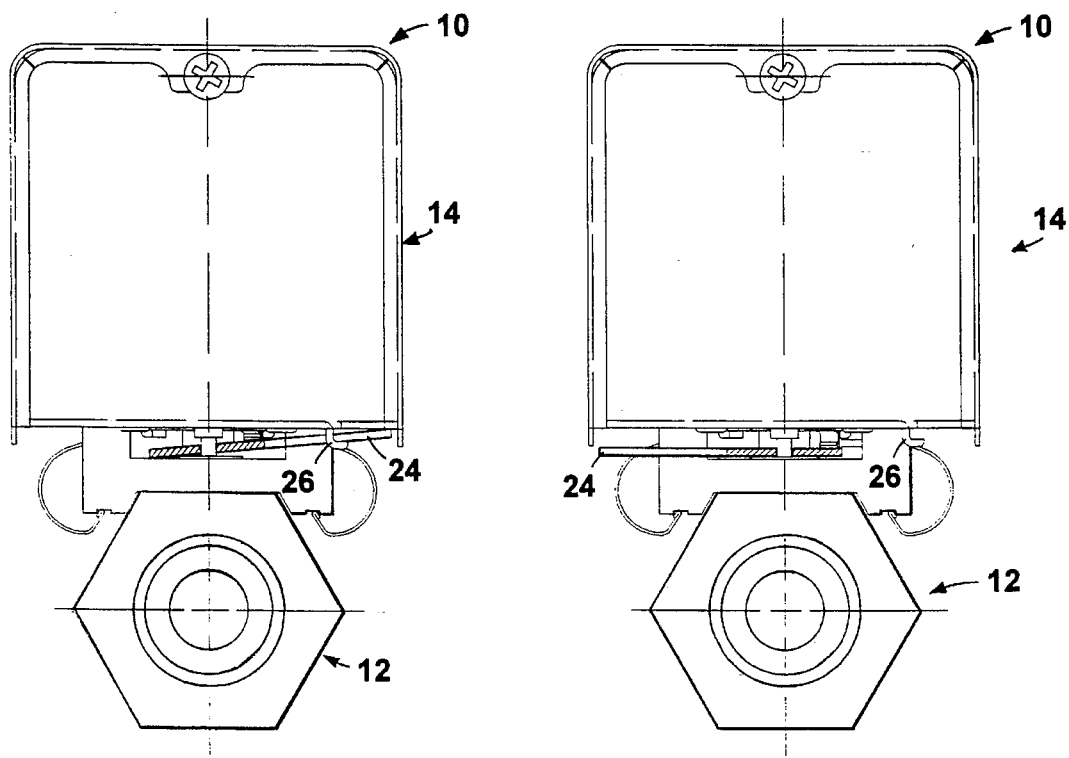
FIG. 1A  FIG. 1B

ACTUATOR AND ZONE VALVE

BACKGROUND OF THE INVENTION

The invention relates to actuators and zone valves for heating systems.

Zone valves are often utilized in hydronic heating and cooling systems. The zone valves isolate specific areas or "zones" of the system. Typically, each zone valve is controlled by a thermostat, which causes the valve to open and close to achieve desired temperature changes.

Conventional zone valves are typically actuated by either a heat motor or an electric motor. In valves with a heat motor as the actuator, an electrically heated element causes linear movement of an actuating element that, in turn, opens the valve. In valves with electric motors, the motor and associated gears move an arm within the valve. As the arm moves, a rubber plunger at its end moves away from a seat, allowing liquid to flow around the plunger. The arm is typically rotated through an angle of only 20° to 30°, leaving the plunger in the path of the flowing liquid.

U.S. Pat. No. 5,131,623 describes a zone valve for a hydronic heating or cooling system in which a motor-driven actuator rotates a ball valve through about a 90° rotation, between closed and opened positions. The motor rotates the valve from its normal position, which may be either open or closed, to the opposite position, e.g., if the valve is normally closed, from the closed to the open position. When the motor is de-energized, the valve is returned to its normal position by a tension spring so configured that it provides sufficient restoring torque to overcome the frictional torque of the ball valve. This type of actuator tends to fail after relatively few cycles, due to fatiguing of the tension spring.

Other zone valves provide restoring torque by mounting a torsional spring on a gear shaft that transmits torque from the motor at a reduced rotational speed, relative to the drive shaft of the motor. A large torsional spring carrying a high preload is required in order to produce adequate restoring torque to the gear shaft. Accordingly, these valves are also subject to failure due to spring fatigue.

Many spring return zone valves suffer from premature failure due to impact when the valve comes to a sudden stop upon returning to its normal position.

SUMMARY OF THE INVENTION

The present invention features an improved zone valve in which a motor-driven actuator assembly rotates a ball valve through about a 90° rotation, between a first, normal position, and an opposite position, e.g., between closed and opened positions. The actuator assembly includes a torsional spring configured to be tightened as the ball valve is rotated by the motor from its normal position to the opposite position. When the motor is de-energized, the spring provides a restoring torque that is sufficient to overcome the resisting frictional torque of the ball valve and inertia and friction of the de-energized motor, causing the drive shaft to rotate counter to the direction of rotation of the motor, thereby returning the valve to its normal position. Preferably, the torsion spring is positioned so that, in the normal position, it is preloaded sufficiently to provide adequate restoring torque to overcome the frictional resistance of the valve. The motor is coupled to the valve stem so that electrical energization of the motor rotates the ball valve through about a 90° rotation, i.e., from its normal position to the opposite position.

Preferred actuator assemblies include a motor having an output shaft, and a drive shaft extending coaxially from the output shaft and configured to transmit torque therefrom. Mounted on the drive shaft is a torsional spring, having a first end fastened to the drive shaft and a second end fastened to a portion of the actuator assembly distant from the shaft housing. The torsional spring is configured so that when the motor is energized, causing the drive shaft to rotate, the rotation of the drive shaft tightens the spring about the shaft housing. The drive shaft includes a pinion gear having a toothed portion. A gear segment, including a toothed portion having a diameter larger than that of the pinion gear, is provided to engage the pinion gear. The toothed portions of the gear segment and the pinion gear mesh so that the gear segment rotates in response to the motor turning the pinion gear. The gear segment is mounted on a gear shaft and is adapted to receive an actuating shaft. The gear segment includes a pair of shock dampers, disposed approximately 180° apart, and a pair of stops positioned relative to the gear segment so that the first stop engages the first shock damper when the valve is in its normal position and the second stop engages the second shock damper when the valve is in its opposite position, to limit the rotation of the gear segment and thus the actuating shaft. The cantilever type shock dampers dampen the force on the motor gear train when the valve moves between positions, providing a smooth decceleration which protects the motor by dampening the force placed on the motor gear train when the valve goes to the normal position.

The improved actuator, configured to use a torsional spring mounted on the drive shaft to supply restoring torque, has been found to have superior durability and reliability. Mounting the spring on the shaft which extends directly from the motor, rather than on the gear shaft, uses the mechanical advantage of the gear arrangement to allow a much smaller restoring torque provided by the spring to be adequate to return the valve to its normal position. Because less restoring torque is required, the spring is preloaded to a lesser extent, and thus a smaller spring can be used and the spring will last significantly longer without fatiguing. Preferred actuator assemblies are able to withstand more than 100,000 return cycles without failure.

In an alternate embodiment, the actuator assembly has a direct drive configuration, i.e., the drive shaft supplies torque directly to an actuating shaft of a device to be operated by the actuator assembly, e.g., the valve stem of a ball valve, without any geared reduction between the rotational speed of the drive shaft and that of the actuating shaft. As in the preferred, geared-down embodiment, the actuator assembly includes a motor having an output shaft, a drive shaft in torque-transmitting relation and coaxial with the output shaft, and a torsional spring mounted on the drive shaft as described above. In this direct-drive embodiment, the first and second shock dampers extend from the drive shaft, disposed approximately 180° apart around the circumference of the shaft housing (i.e., approximately across from each other), and rotation of the drive shaft is limited by first and second stops, positioned relative to the drive shaft so that the first stop engages the first shock damper when the valve is in its normal position and the second stop engages the second shock damper when the valve is in its opposite position. The drive shaft preferably further includes first and second rebound stop members, disposed from about 15° to 20° apart on one side of the line defined by the shock dampers, to prevent overstressing of the shock dampers.

In another aspect, the invention features an improved ball valve. The ball valve includes a valve body including a first body member and a second body member adjacent the first body member, the first and second body members defining a through-passage and a ball valve element, having a bore therethrough, disposed within the valve and movable between an open position, in which the bore is in fluid communication with the through-passage, and a closed position, in which the ball valve element seals the through-passage. A ball seat is interposed between the first and second body members and positioned to engage the ball member and, when said valve is in the closed position, seal against the ball member to prevent fluid from passing by the ball. The ball seat is resiliently biased against the first body member and against the ball, preferably by an o-ring. The resilient biasing of the ball seat provides a ball valve having significantly lower torque than similar ball valves in which the ball seat is rigidly mounted.

In preferred embodiments, the torsional spring is a round wire torsional coil spring. Preferably the spring is a music wire (ASTM A228) with a high fatigue and tensile strength. More preferably the wire has a tensile strength of at least 300,000 psi. It is also preferred that the shaft housing, pinion gear and gear segment be of a plastic material, more preferably a glass-filled nylon with a fluorocarbon lubricant, for optimal wear resistance and low friction.

In other preferred embodiments, a manually-operated lever arm is coupled to the actuating shaft (ball valve stem). By connecting the lever arm directly to the stem of the ball valve, rather than to a shaft within the actuator assembly, the lever arm can be used to manually open and close the ball valve when the actuator assembly has been removed (e.g., for repair).

Preferably, the ball valve may be easily converted from a normally open to a normally closed valve by disconnecting the ball valve from the actuator assembly, rotating the ball valve 90° with respect to the actuator assembly, and reconnecting the ball valve and actuator assembly.

Other features and advantages of the invention will be apparent from the following description of a presently preferred embodiment and from the claims.

BRIEF DESCRIPTION OF THE DRAWINGS

FIG. 1 shows a side view of an actuator assembly and ball valve according to one embodiment of the invention. FIGS. 1A and 1B are side views of the manual lever arm and catch components of the ball valve, taken along line 1A—1A in FIG. 1.

DESCRIPTION OF THE PREFERRED EMBODIMENTS

Figure 2:
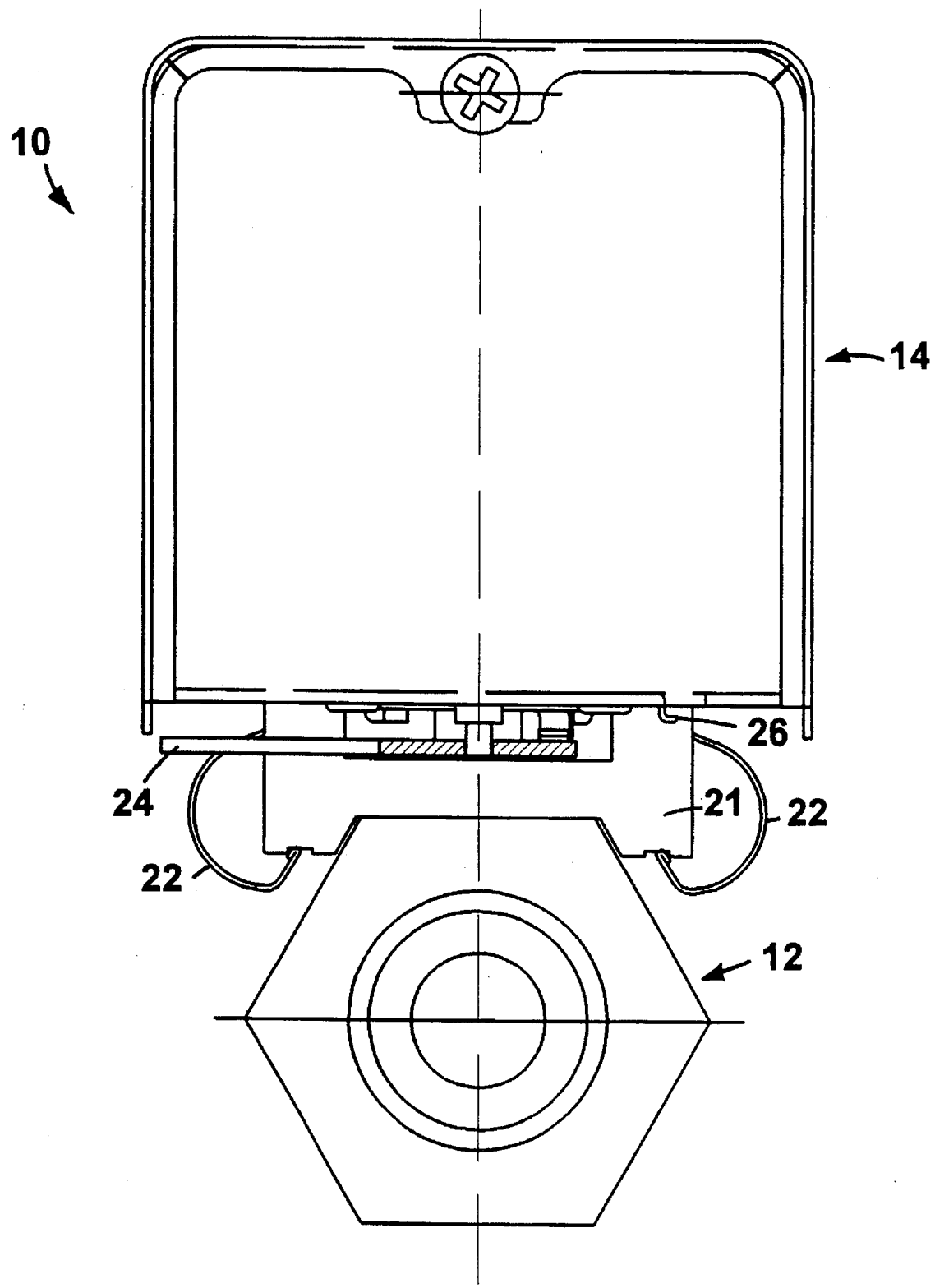
FIG. 2 shows a front view of the actuator assembly and ball valve shown in FIG. 1.

FIGS. 1 and 2 show a preferred zone valve 10. Ball valve 12 is driven by actuator assembly 14. The actuator assembly 14 is coupled to stem 16 of the ball valve 12, enabling rotation of ball 18 (FIGS. 3 and 5), to either close or open the valve. The actuator is electrically operated, and has wires 20 for coupling it to conventional power and control circuitry. Actuator assembly 14 preferably includes a saddle member 21, which may be removably coupled to ball valve 12, e.g., by gullwing springs 22 as shown. Gullwing springs are preferred over other types of clamps or bolts, as they allow the valve to be easily removed from the actuator assembly without the need for any tools.

As shown in FIG. 1, the zone valve has a manually-operated lever arm 24, coupled directly to valve stem 16, to permit manual opening of the valve. FIG. 1 is broken away in the area in which the arm is coupled to the valve stem. The lever arm 24 provides a way of opening the zone valve when the actuator assembly is inoperable, for example, during a power outage. By coupling the lever arm directly to the stem, rather than to the actuator assembly, the lever arm remains on the valve when the actuator assembly is removed, thus allowing manual operation of the ball valve even when the actuator assembly has been removed for repair. When the operator rotates the lever arm into the valve-open position, a catch 26 on the under side of the housing holds the arm in that position. A cantilever spring 28 assists in releasing the lever arm when the actuator resumes proper operation.

Figure 3:
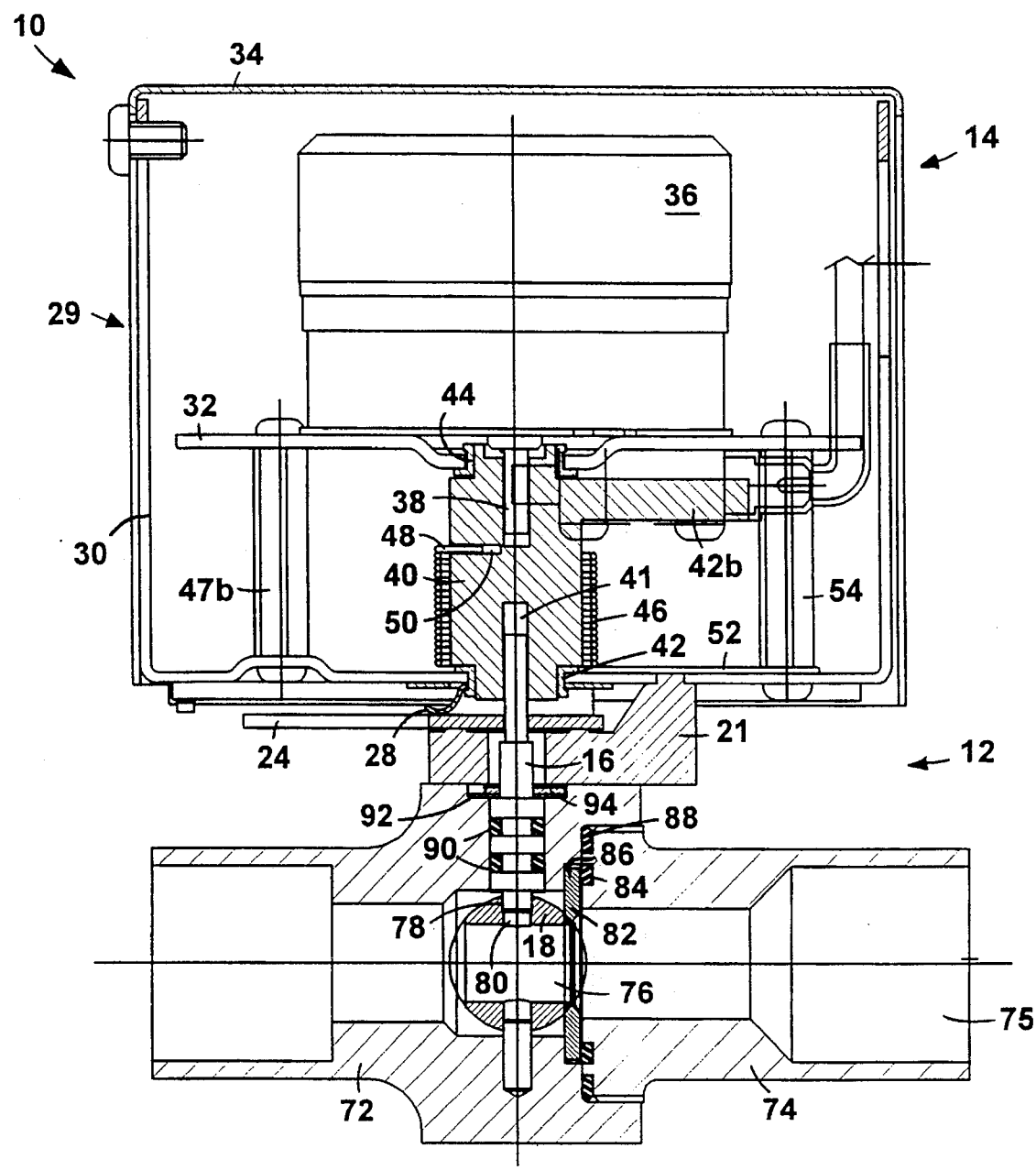
FIG. 3 shows a cross-sectional side view of an actuator assembly and ball valve according to a first embodiment of the invention.

Referring to FIG. 3, a zone valve 10 including an actuator assembly 14 according to the "direct-drive" embodiment of the invention is shown. An actuator housing 29 is provided, typically of sheet metal, consisting of U-shaped base frame 30, support shelf 32, and cover 34. Support shelf 32 is spaced from base frame 30 and supported by standoffs 47a, 47b, 54 (47a is behind and in line with 47b, and thus is not visible in FIG. 3). A synchronous gear motor 36, preferably an AC motor, is mounted on top of support shelf 32. A preferred motor is one having relatively high internal resistance, e.g., a motor having a gear ratio of at least 100:1, creating inertial resistance. Suitable motors are commercially available from Hansen Mfg. and Cramer Company. Preferably, the motor is mounted loosely on the support shelf, e.g., held down by tabs to prevent vertical movement while allowing limited horizontal displacement. The motor 36 includes a output shaft 38 which protrudes through to the underside of the support shelf. Bushings 42 in base 30 and 44 in shelf 32 support the output shaft 38. The protruding portion of output shaft 38 is surrounded by drive shaft 40, which extends downward from the drive shaft and includes an aperture 41 for receiving valve stem 16.

Figure 4:
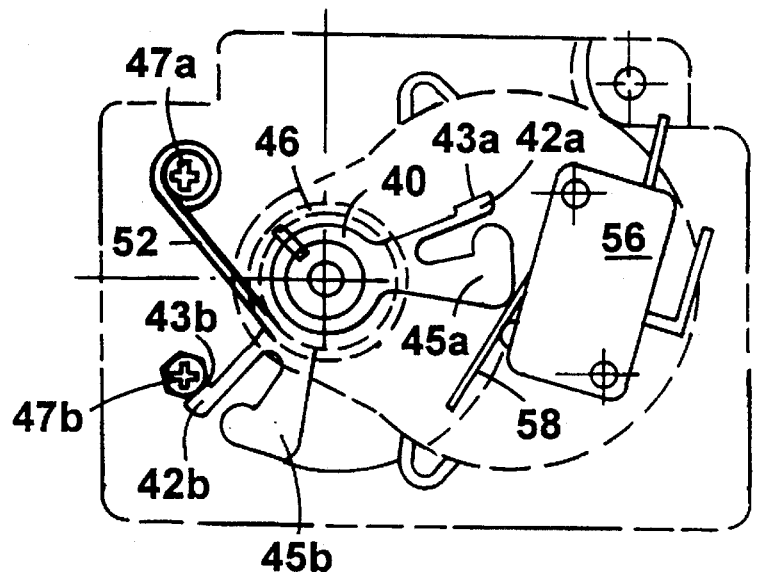
FIGS. 4 and 4A show top views of the actuator assembly of FIG. 3, with the top portion of the housing removed.

Referring now to FIG. 4, extending radially from the drive shaft 40 are a pair of shock dampers 42a, 42b, the opposite end surfaces 43a, 43b of which are disposed approximately 180° apart around the circumference of the shaft housing. Between the shock dampers are disposed a pair of rebound stops 45a, 45b, spaced about 90° apart around the circumference of the shaft, and each spaced about 20° from a corresponding shock damper to prevent overstressing of the shock dampers. Standoffs 47a, 47b are positioned with respect to the shaft housing so that they serve as stops which engage surfaces 43b and 43a, respectively, when the shaft housing, and thus the ball valve, is in its normal position (FIG. 4) and opposite position (FIG. 4A), thereby limiting rotation of the shaft housing to 90°.

Mounted on the shaft housing is a torsional spring 46. Preferably, the spring is a round wire torsional coil spring, formed from music wire (ASTM A228) having a tensile strength of about 330,000 psi and a diameter of about 0.028 to 0.032 inches. Preferably, the spring includes from about 10 to 20 turns, and the diameter of the coil is from about 0.75 to 0.85 inches. Suitable springs are commercially available from Lee Spring Company. One end 48 of torsional spring 46 is retained in an aperture 50 in drive shaft 40, and a second end 52 is attached to standoff 54 (or some other portion of the actuator housing distant from drive shaft 40). Second end 52 is positioned so that the spring is already tightened to some extent, i.e., a preload is applied to the spring when the valve is in its normal position. Sufficient preload is applied so that the spring is capable of applying sufficient restoring torque to overcome the frictional resistance of the valve and return the valve to its normal position, from any angular position. Preferably, the preload is about 2 to 3 inch-ounces, more preferably 2.7 inch-ounces. When the preferred preload of 2.7 inch-ounces is applied, the resulting spring torque at the full open position is about 5.4 inch-ounces. The torsional spring is configured so that when the motor is energized, causing the output shaft 38 to rotate, the rotation of the drive shaft tightens the spring about drive shaft 40.

Figure 4A:
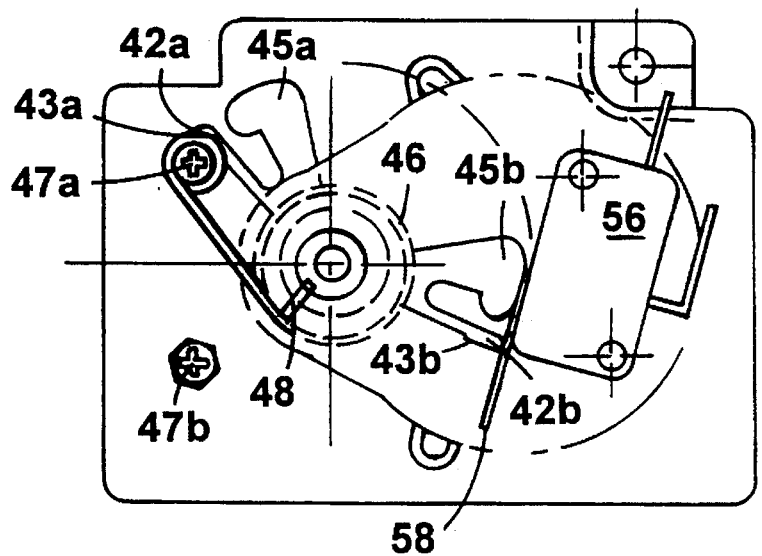

Operation of the actuator 14 is illustrated in FIGS. 4–4A. In FIG. 4, the actuator is in a rest or non-actuated state, corresponding to the zone valve being closed. (Operation of the valve will be discussed assuming that the valve is a "normally closed" valve. However, it will be appreciated that it may be desirable to operate in the reverse direction, with the ball valve set in a normally open position. In this case, the ball 18 would move from an open to a closed position during the actuation process shown in FIGS. 4–4A.) Although the spring is preloaded when the valve is in its normal position and the actuator is in the rest position shown in FIG. 4, rotation of output shaft 38 is prevented because surface 43b of shock damper 42b is at rest against standoff (stop) 47b.

In FIG. 4A, the motor has rotated output shaft 38, and thus drive shaft 40, 90° relative to the position shown in FIG. 4, moving the valve to its fully open position. Further motion has been stopped by surface 43a of shock damper 42a engaging standoff 47a. Electrical current is still being provided to motor 36, but the motor has stalled and will not rotate further. In this position, torsional spring 46 is tightened against drive shaft 40.

As long as the thermostat continues to call for the zone valve to remain open, the motor remains in a stalled condition, providing torque to resist the restoring torque provided by spring 46. When the thermostat calls for the zone valve to close, however, electrical current to the motor is switched off, and the motor no longer provides a forward-driving torque, initiating the return cycle.

When the motor is de-energized, the restoring torque provided by spring 46 is no longer resisted, and the spring creates a restoring torque which overcomes the frictional resistance of the valve and inertial resistance of the de-energized motor and begins rotation of output shaft 38. Rotation continues until the shaft housing reaches the at rest position of FIG. 4, returning the valve to its normal position. When the shaft housing reaches the at rest position, shock damper 42b will again engage standoff 47b, as shown in FIG. 4, preventing further rotation.

If the valve has been manually set in an open position using the manual actuator lever arm 24, the lever arm is kicked free of catch 26 when the shaft housing is rotated to the position shown in FIG. 4A. This occurs because the lever arm 24 is rotated further than the catch 26, thus allowing the cantilever spring 28 to pop the lever arm downward out of the way of catch 26 (see FIGS. 1A and 1B).

Figure 5:
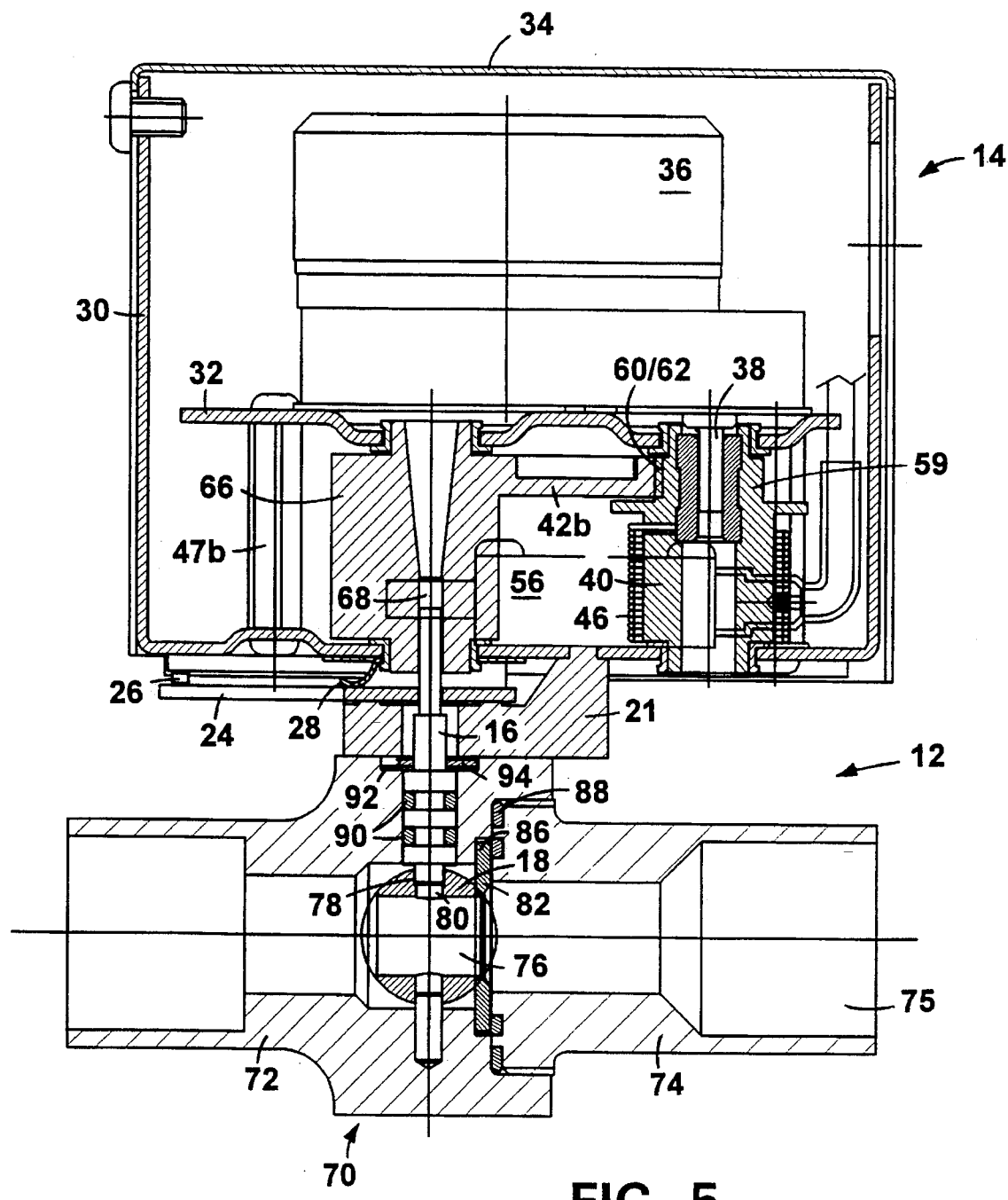
FIG. 5 shows a cross-sectional side view of an actuator assembly and ball valve according to a first embodiment of the invention.
Figure 6:
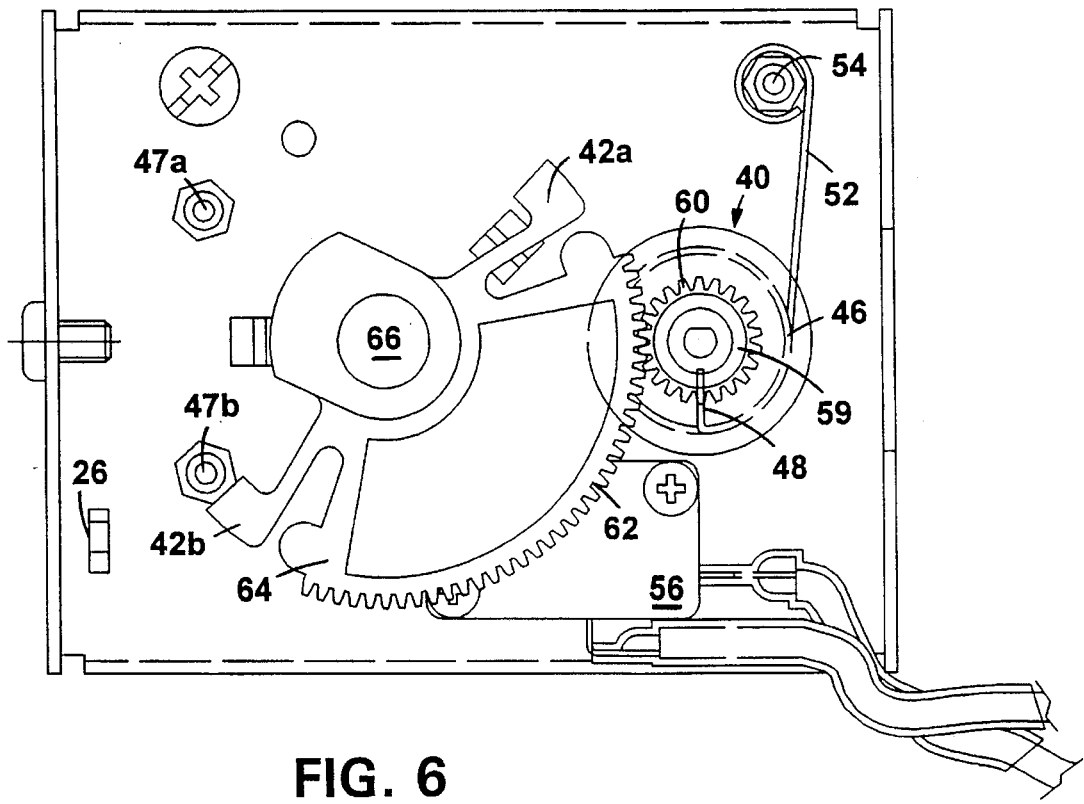
FIGS. 6 and 6A show top views of the actuator assembly of FIG. 5, with the top portion of the housing removed.
Figure 6A:
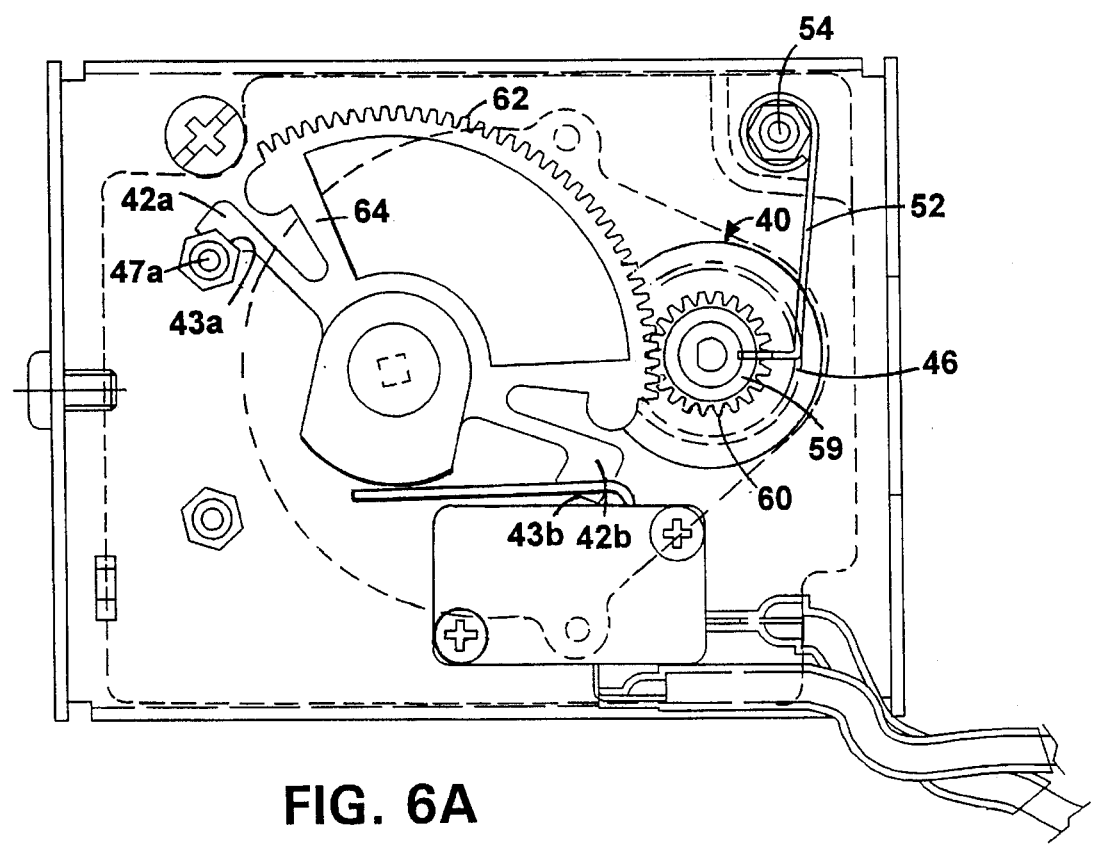

Referring now to FIGS. 5, 6 and 6A, an actuator assembly 14 according to the preferred "gear reduction" embodiment of the invention is shown. In this embodiment, drive shaft 40 is not directly coupled to valve stem 16. Instead, drive shaft 40 includes a pinion gear 59 having a toothed portion 60, which engages a corresponding toothed portion 62 of gear segment 64. Gear segment 64 is disposed on gear shaft 66, which includes an aperture 68 for receiving valve stem 16 in a torque-transmitting manner. Pinion gear 59 and gear segment 64 are preferably plastic, to provide good wear resistance. A particularly preferred plastic is a glass-filled nylon containing a fluorocarbon lubricant, e.g., AKZO J4/30/TF/15 internally lubricated nylon, commercially available from AKZO. The actuator assembly shown in FIG. 5 operates in a manner similar to that shown in FIG. 3. Torsional spring 46 is again mounted on drive shaft 40, and in this case is attached to standoff 54. In this embodiment, the spring preferably is formed from music wire (ASTM A228) having a tensile strength of about 330,000 psi and a diameter of about 0.028±0.0003 inches. Preferably, the spring includes from about 10 to 20 turns, more preferably 17 turns, and the diameter of the coil is from about 0.750 to 0.800 inches. The torsional spring 46 is tightened about the shaft 40 as the motor rotates the drive shaft, and thus the valve, from its closed position (FIG. 6) to its open position (FIG. 6A). When the motor is de-energized, spring 46 will supply a restoring torque, causing reverse rotation of the drive shaft which will be transmitted via the gear segment 64 to the valve, returning the valve to its closed position. Shock dampers 42a and 42b, on gear segment 64, engage stops 47a and 47b, in the manner described above, to limit rotation of the gear segment to 90°.

In both embodiments, a switch 56 is mounted on the support shelf 32. The switch is actuated by an arm 58 attached to the switch body 56 when the zone valve reaches the open position (FIG. 4A). The switch functions in a conventional manner, to indicate to the furnace control circuit that the zone valve is open.

The actuators described above are preferably used with ball valve 12, as shown in FIGS. 3 and 5, to form a zone valve for a hydronic heating or cooling system. Preferably, ball valve 12 is a quarter turn, single seat ball valve. The ball valve has a valve body 70 which includes a first body member 72 and a second body member 74, the first and second body members defining a through-passage 75. Body member 72 supports the ball 18, which has a channel 76 therethrough and which is rotated into an open or closed position by the rotation of stem 16. The ball 18 includes a rectangular slot 78 at the top side thereof for connection to the stem 16, which has a rectangular drive end 80. When the ball valve 12 is in the open position the ball channel 76 is aligned with through-passage 75, allowing fluid flow. The ball channel 76 is configured so as to offer minimal resistance to the flow of fluid when the ball 18 is in the fully open position. The ball valve 12 may be converted from a normally open to a normally closed valve by disconnecting the ball valve from the actuator assembly, rotating the ball valve 90° with respect to the actuator assembly, and reconnecting ball valve and actuator assembly.

The ball valve 12 also includes a valve seat 82 which is designed to provide a seal between the ball 18 and the second body member 74. When the ball 18 is in the closed position, fluid is trapped upon entering the ball valve 12 by the valve seat 82, a seat o-ring 84, the second body member 74, and the ball 18. The valve seat 82 provides a dynamic seal, as it is preferably made of resilient material suitable for the cyclic rotation of the ball 18 while under mechanical deformation due to being mechanically loaded against the second valve member 74 by the ball 18. The valve seat 82 is sized to float in a cavity 86 of the valve body 70 so that during assembly of the ball valve 12, the valve seat 82 will be self-centering on the sphere of the ball 18.

The valve body 70 is provided with body o-rings 88 which effect a seal between the first and second body members, thus preventing leakage from the inside of the ball valve 12 to the outside of ball valve 12. The seat o-ring 84 effects a seal between the second body member 74 and the valve seat 82, thus preventing leakage between the body member 74 and valve seat 82. Seat o-ring 84 also resiliently biases the valve seat 82 against the ball member 18, improving the seal formed therebetween when the valve is closed and reducing the torque of the valve. The resilience of the o-ring 84 also provides a continuous seal as seat 82 wears during normal valve operation. If desired, however, the o-ring 84 could be replaced by another type of biasing element, e.g., a compression spring or "wavy washer".

The valve stem 16 is preferably provided with two stem o-rings 90 which effect a dynamic seal between the stem 16 and the first body member 72. The stem 16 is further provided with a stem washer 92 having a circular center hole for attachment to the stem 16. Any thrust up the stem 16 due to fluid pressure or motion of the ball 18, is transmitted through the stem washer 92 to a low coefficient of friction stem washer 94 for transmission of the thrust load to a saddle member 21.

Figure 7:
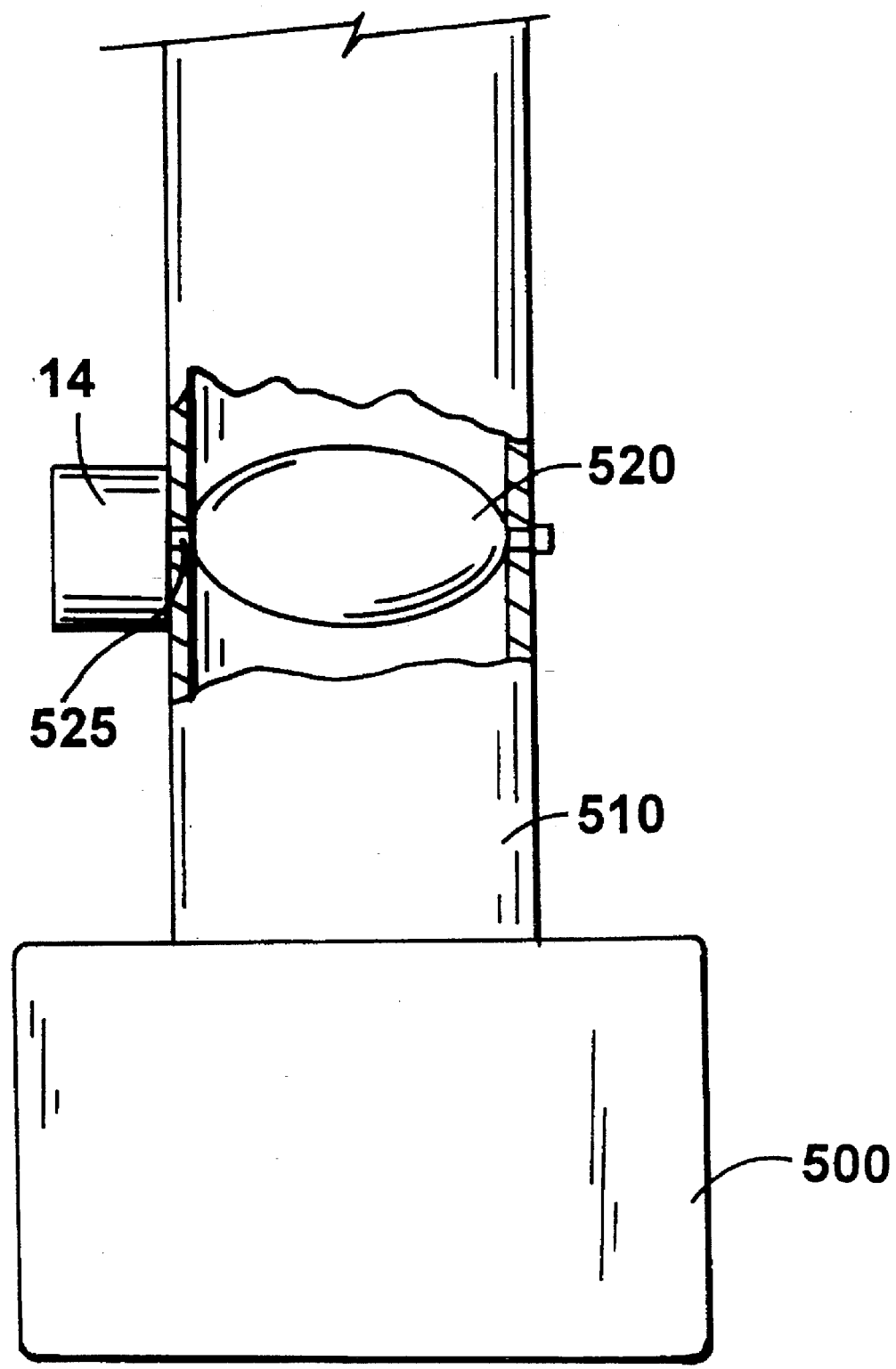
FIG. 7 shows an actuator assembly according to one embodiment of the invention utilized in conjunction with a flue damper.

While the actuator assembly 14 and the ball valve 12 operate together as a zone valve in a preferred embodiment of the present invention, it will be appreciated that the actuator assembly 14 may be utilized in conjunction with other devices such as a flue damper. With reference to FIG. 7, a furnace 500 is illustrated with an attached flue 510. Inside of the flue 510, is positioned a flue damper 520 which is operable to be opened between an open and closed position. The flue damper 520 is typically rotated about 90° by a damper stem 525. According to a further embodiment of the present invention, the actuator assembly 14 as described above, may be attached alongside the flue 510 and operationally connected to the damper stem 525. Therefore, as the actuator assembly operates in accordance with the description associated with FIGS. 4–4A, the flue damper 520 may be rotated about 90° between closed and open positions.

Other embodiments of the invention are within the following claims. Valves in which the rotation is less than or more than 90 degrees can benefit from the invention.

We claim:

1. A ball valve comprising
   a valve body including a first body member and a second body member adjacent the first body member, said first and second body members defining a through-passage,
   a ball valve element having a bore therethrough, said ball valve element being disposed within the valve body and movable between an open position, in which the bore is in fluid communication with said through-passage, and a closed position, in which said ball valve element seals said through-passage, and
   a ball seat interposed between the first and second body member and positioned to engage said ball valve element and, when said ball valve element is in the closed position, seal against the ball valve element to prevent fluid from passing by the ball valve element, said ball seat being resiliently biased against the first body member and against the ball valve element by a single biasing member positioned to provide both a fluid seal and a resilient bias between said ball seat and said first member.

2. The ball valve of claim 1 wherein said ball seat is resiliently biased against the first body member by an o-ring.

* * * * *

UNITED STATES PATENT AND TRADEMARK OFFICE
CERTIFICATE OF CORRECTION

PATENT NO.   : 5,540,414

DATED        : July 30, 1996

INVENTOR(S)  : Attilio Giordani and Richard Genga

It is certified that error appears in the above-identified patent and that said Letters Patent is hereby corrected as shown below:

Col. 4, lines 66 and 67, "0,028 to 0,032" should be --0.028 to 0.032--.

Col. 7, line 2, "valve member 74" should be --body member 74--.

Col. 8, line 26, "member" should be --members--.

Signed and Sealed this

Twenty-first Day of January, 1997

Attest:

BRUCE LEHMAN

Attesting Officer

Commissioner of Patents and Trademarks